Feb. 1, 1944.    G. E. LINDEMANN    2,340,395
PRESSURE RESPONSIVE INDICATING INSTRUMENT
Original Filed Dec. 16, 1939    2 Sheets-Sheet 1

Inventor
George E. Lindemann
by Lawson Coms & Booth
Attorneys

Inventor
George E. Lindemann
by Booth & MacDuff
Attorneys

Patented Feb. 1, 1944

2,340,395

UNITED STATES PATENT OFFICE 2,340,395

PRESSURE RESPONSIVE INDICATING INSTRUMENT

George E. Lindemann, Chicago, Ill., assignor to Republic Flow Meters Company, Chicago, Ill., a corporation of Illinois Original application December 16, 1939, Serial No. 309,695. Divided and this application May 16, 1942, Serial No. 443,811

8 Claims. (Cl. 73—110)

This invention relates to indicating instruments and more particularly to instruments responsive to a physical condition to indicate variations therein.

One of the objects of the invention is to provide an indicating instrument which may easily and quickly be calibrated to adjust its characteristics. According to one important feature calibration may be effected by varying the effective length of a balancing spring.

Another object of the invention is to provide an indicating instrument in which the zero position may easily and quickly be set. Preferably this is done by shifting the balance spring to change its initial tension without changing its characteristics.

Other objects, advantages and novel features of the invention will be apparent from the following description when read in connection with the accompanying drawings, in which—

Figure 1:
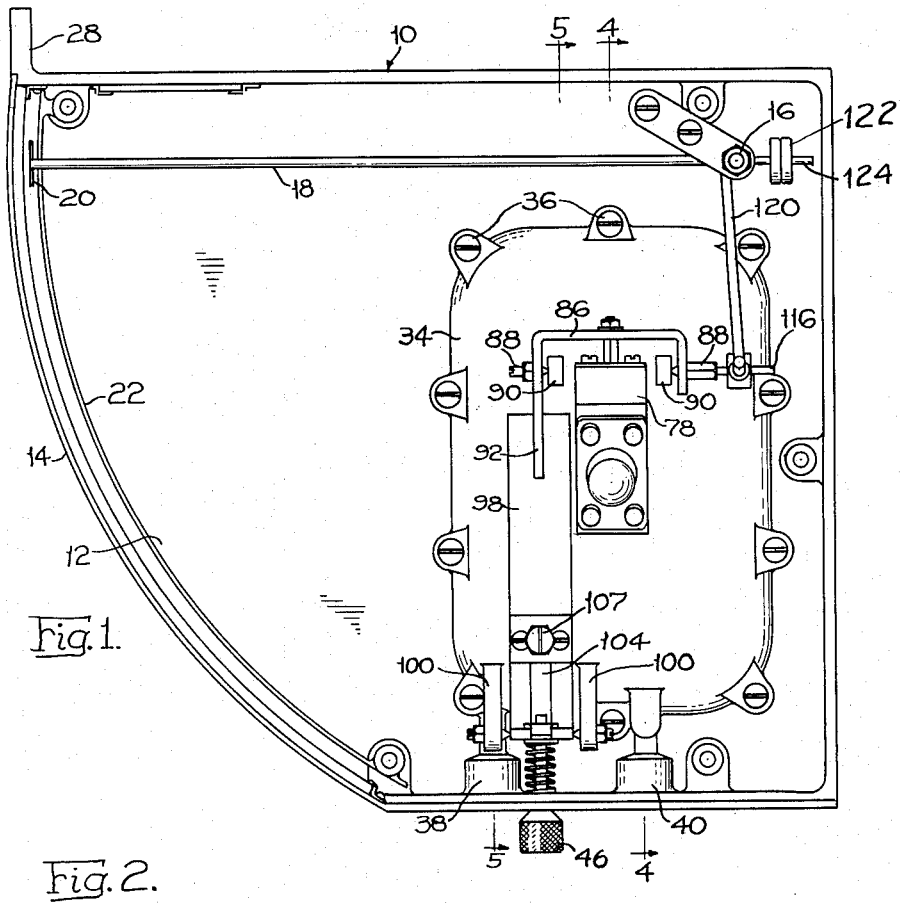
Figure 1 is a side elevation of an instrument embodying the invention with the cover removed.
Figure 2:
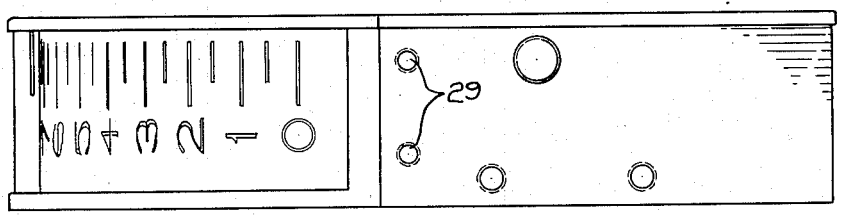
Figure 2 is a bottom view of Figure 1.
Figure 3:
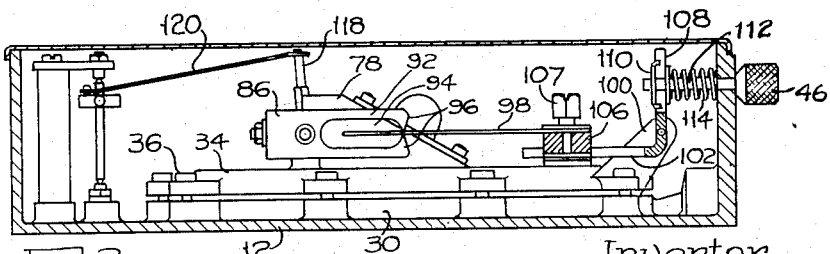
Figure 3 is a side view looking from the left in Figure 1 with the casing cut away and with parts in section.

The instrument of the present invention is shown as housed in a casing for panel mounting as more particularly described and claimed in my copending application, Serial No. 309,695 filed December 16, 1939, of which this application is a division. The casing comprises a box like casting 10 such as a die casting having an integral side wall 12 and with its other side open to be closed by a cover plate 26. The forward face of the casing is closed by a transparent cover 14 curved about a center 16 and a pointer arm 18 may be pivoted at 16 to swing across the arcuate face of the instrument. A laterally extending pointer 20 is carried by the outer end of the arm 18 and moves across the face of a translucent curved dial 22 appropriately calibrated. The casing may be mounted by means of a flange 28 at the upper end of its arcuate wall and by one or more tapped openings 29 adjacent the lower end thereof.

Figure 4:
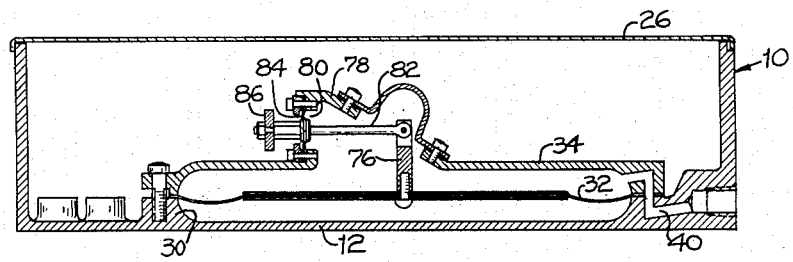
Figure 4 is a section on the line 4—4 of Figure 1.
Figure 5:
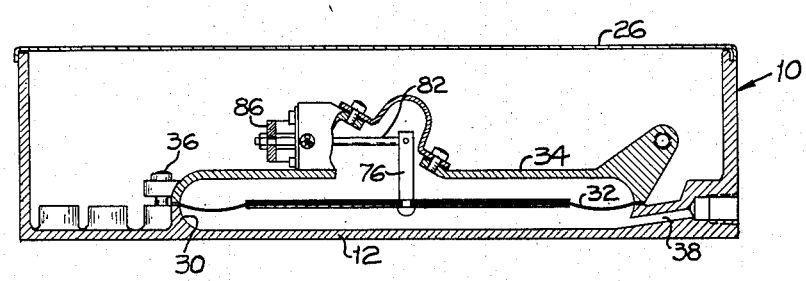
Figure 5 is a broken section on the line 5—5 of Figure 1.

In the instrument illustrated a differential pressure such as that resulting from draft may be indicated and for this purpose the casing side wall 12 is formed with an inwardly projecting continuous flange 30 upon which a flexible diaphragm 32 is supported. The diaphragm is inclosed by a cover 34 clamped to the flange 30 by screws 36 to provide differential pressure chambers on the opposite sides of the diaphragm. Pressure communication with these chambers may be established by passages 38 and 40 formed in the casing side 12 and tapped to receive pressure connections at the bottom of the casing. As shown in Figure 4, the passage 40 has an extension in the cover 34 to communicate with the outer side of the diaphragm.

In order to connect the diaphragm with the pointer 18, the diaphragm carries a stem 76 which projects into an extension 78 on the cover 34. The projection 78 has a lateral opening 80, and a lever 82, having one end pivotally secured to said stem, projects through said opening and is sealed therein by means of a flexible diaphragm 84. The outer end of the lever 82 is secured to the central portion of a yoke 86, the legs of which extend along the sides of the projection 78. Pivots 88 are threadedly secured in the legs of the yoke 86 and are seated in suitable depressions in the sides of projections or lugs 90 integrally formed upon the casting 34. The pivots 88 are aligned substantially in the plane of the sealing diaphragm 84. One leg of the yoke 86 projects beyond the respective pivot 88 to form a lever 92 and this lever is formed with a deep notch 94 extending lengthwise thereof from its end and dividing it into two substantially parallel arms. The ends of the arms are formed with opposed fulcrum points 96 which are spaced apart a distance substantially equal to the thickness of a flat metal balance spring 98.

The casting 34 is provided adjacent its lower margin with a pair of projecting lugs 100 between which a lever 102 is pivoted. The lever 102 is bent at right angles to form a bell crank. One arm of the lever is provided with a longitudinal slot 104 and extends substantially parallel to the spring 98 and the lever 92. The end of the spring 98 is secured to said arm by means of opposed blocks 106 formed with feathers adapted to seat in said slot and positioned on opposite sides of the arm. A clamping screw 107 is provided to draw said blocks into clamping relation with said arm so that they may be secured in any of several adjusted positions along said slot. The spring 98 projects between the fulcrum points 96 and into the slot 94. The other arm of the bell crank lever 102 is provided with a slot 108 adapted to receive a feather formed on a nut 110 which bears against one side of said other arm and into which is threaded an adjusting screw 112. The adjusting screw 112 projects through the bottom of the casing 12 and has secured to it a zero adjusting knob. A coil spring 114 is positioned between the lever 102 and the bottom of the casing around the adjusting screw 112 and acts to press the lever against the nut 110. The feather on the nut prevents it from turning with the screw when adjustments are to be made.

The pivot 88 opposite the lever 92 is provided with an extension 116 to which is secured a lever 118. A link 120 connects the outer end of lever 118 and the indicator 18 at a point spaced horizontally from its pivot. Since the lever 118 is longer than the radial distance between the axis of indicator 18 and its point of connection to the link 120 angular movement of the lever 118 will produce a greatly increased movement of the indicator 18. The indicator may be counterbalanced by suitable weights 122 mounted upon a threaded extension 124 thereof.

The operation of this instrument is as follows. Differential pressures are applied to the diaphragm through connections to the passages 38 and 40. As these pressures vary, the diaphragm moves up or down until the spring 98 exerts a pressure capable of counterbalancing the pressure difference. The motion of the diaphragm is transmitted to the indicator 18 through the linkage comprising the lever 82, yoke 86, lever 118, and link 120, whereby the pointer is moved to indicate the new condition. When it is desired to adjust the zero position of the instrument, knob 46 is turned so that the screw 112 is turned to be threaded into or out of the nut 110 whereby the lever 102 is rocked upon its pivots. This varies the pressure which the spring 98 exerts upon the lever 92 for a given position of the diaphragm whereupon the indicator 18 may be set to the desired zero position, if identical pressure is admitted to the opposite sides of the diaphragm through the passages 38 and 40.

If it is desired to change the characteristic of the instrument the cover plate 26 may be removed and the spring 98 may be shifted by loosening the screw 107 and sliding the blocks 106 along the slot 104 so that a greater or less length of the spring extends between said blocks 106 and the fulcrum points. If the spring is to be shortened to decrease the sensitivity of the instrument the excess or unused portion of the spring merely projects into the notch 94. If the effective length of the spring is to be increased, unused portions are withdrawn from the said notch.

Figure 6:
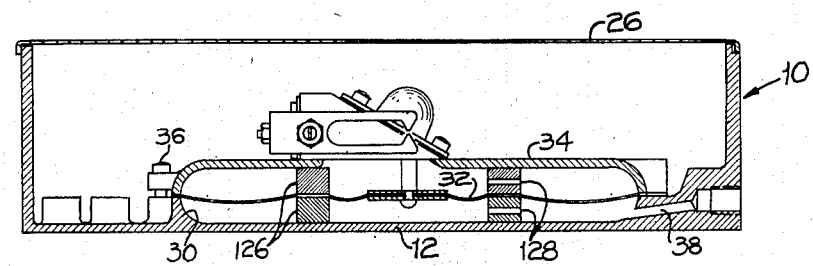
Figure 6 is a section similar to Figure 5 with parts in elevation showing the use of reducer rings.

Figure 6 illustrates a method of adapting one of these instruments to use with greater pressures, or where less sensitivity is desired. To accomplish this purpose, I provide two rings 126 of metal or other solid substance which may be placed on opposite sides of the diaphragm to inclose a portion thereof of reduced area, the rings being of such thickness that they are securely clamped between the walls of the diaphragm casing. Passages 128 may be formed in said rings to permit the pressures transmitted through the passages 38 and 40 to be transmitted into the space inclosed by said rings. It will be seen that the area of the diaphragm inclosed by said rings is the only area which is affected by these pressures to operate the instrument. It will be understood that the diaphragm washers must be proportionately reduced in size.

While illustrative embodiments of my invention have been described in detail it is not my intention that the scope of the invention shall be limited to those embodiments or otherwise than by the terms of the appended claims.

What is claimed is:

1. An indicating instrument comprising a condition responsive element, a lever pivotally mounted on a fixed axis and connected to the element to be moved thereby, indicating means connected to the element to be operated thereby, a flat balance spring engageable with the end of the lever, a pivotally mounted arm lying substantially parallel to the lever, mounting means for the spring carried by and shiftable lengthwise of the arm to vary the effective length of the spring, and means to adjust the position of the arm about its pivot to vary the initial loading of the spring.

2. An indicating instrument comprising a condition responsive element, a lever pivotally mounted on a fixed axis and connected to the element to be moved thereby, indicating means connected to the element to be operated thereby, a flat balance spring engageable with the end of the lever to oppose movement thereof, a pivoted element, means for swinging the pivoted element to vary the pressure of the spring on the lever, and a mounting member for the spring shiftable lengthwise of the lever to vary the effective length of the spring.

3. An indicating instrument comprising a condition responsive element, a pivotally mounted lever connected to the element to be moved thereby, indicating means connected to the element to be operated thereby, said lever being formed with a deep notch in its end dividing it into two arms having opposed fulcrum points at their ends, a flat spring projecting into the notch and having its opposite faces engageable with the fulcrum points respectively to oppose movement of the lever, and mounting means for the spring shiftable lengthwise of the lever to vary the effective length of the spring.

4. An indicating instrument comprising a condition responsive element, a pivotally mounted lever connected to the element to be moved thereby, indicating means connected to the element to be operated thereby, said lever being formed with a deep notch in its end dividing it into two arms having opposed fulcrum points at their ends, a flat spring projecting into the notch and having its opposite faces engageable with the fulcrum points respectively to oppose movement of the lever, a pivoted element, means for swinging the pivoted element to vary the pressure of the spring on the lever, and a mounting member for the spring shiftable lengthwise of the lever on the pivoted element to vary the effective length of the spring.

5. An indicating instrument comprising a diaphragm chamber having a central projection formed with a lateral opening, a diaphragm in the chamber having a stem extending into the projection, a lever pivotally secured at one end to said stem and extending through the lateral opening, indicating means connected to the other end of the lever to be operated by movement of the lever, a sealing diaphragm secured to the lever and around the periphery of the lateral opening, a yoke secured in its central portion to the lever and having its legs pivoted outside of the diaphragm chamber on opposite sides of the projection on a pivotal axis substantially in the plane of the sealing diaphragm, one leg of the yoke extending beyond its pivot mounting to provide a lever extension, a flat spring engaging the lever extension to oppose movement thereof, and mounting means for the spring shiftable longitudinally of the lever to vary the effective length of the spring.

6. An indicating instrument comprising a diaphragm chamber having a central projection formed with a lateral opening, a diaphragm in the chamber having a stem extending into the projection, a lever pivotally secured at one end to said stem and extending through the lateral opening, indicating means connected to the other end of the lever to be operated by movement of the lever, a sealing diaphragm secured to the lever and around the periphery of the lateral opening, a yoke secured in its central portion to the lever and having its legs pivoted outside of the diaphragm chamber on opposite sides of the projection on a pivotal axis substantially in the plane of the sealing diaphragm, one leg of the yoke extending beyond its pivot mounting to provide a lever extension, a flat spring engaging the lever extension to oppose movement thereof, and mounting means for the spring including a pivoted element, means for swinging the pivoted element to vary the pressure of the spring on the lever, and a mounting member for the spring shiftable on the pivoted element lengthwise of the lever extension to vary the effective length of the spring.

7. An indicating instrument comprising a diaphragm chamber having a central projection formed with a lateral opening, a diaphragm in the chamber having a stem extending into the projection, a lever pivotally secured at one end to said stem and extending through the lateral opening, indicating means connected to the other end of the lever to be operated by movement of the lever, a sealing diaphragm secured to the lever and around the periphery of the lateral opening, a yoke secured in its central portion to the lever and having its legs pivoted outside of the diaphragm chamber on opposite sides of the projection on a pivotal axis substantially in the plane of the sealing diaphragm, one leg of the yoke extending beyond its pivot and having a notch in its end dividing it into two arms having fulcrum points at their ends, a flat spring projecting into the notch with its opposite faces engaging the fulcrum points to oppose swinging of the yoke, and mounting means for the spring shiftable longitudinally of said arms to vary the effective length of the spring.

8. An indicating instrument comprising a condition responsive element, a lever pivoted on a fixed axis and connected to the element to be moved thereby, indicating means connected to the element to be operated thereby, a second pivoted lever lying substantially parallel to the first named lever, means to adjust the angular position of the second lever, a flat spring, means adjustably mounting the spring for lengthwise adjustment along one of the levers, and means adjacent the end of the other lever slidably engaging the spring.

GEORGE E. LINDEMANN.